United States Patent
Relyea et al.

(10) Patent No.: US 8,578,300 B2
(45) Date of Patent: Nov. 5, 2013

(54) MEDIA CONTENT USER INTERFACE SYSTEMS AND METHODS

(75) Inventors: Donald H. Relyea, Dallas, TX (US); Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 12/983,072

(22) Filed: Dec. 31, 2010

(65) Prior Publication Data

US 2012/0174037 A1 Jul. 5, 2012

(51) Int. Cl.
*G06F 3/048* (2013.01)

(52) U.S. Cl.
USPC .......................................................... 715/848

(58) Field of Classification Search
USPC .......................................................... 715/848
See application file for complete search history.

(56) References Cited

U.S. PATENT DOCUMENTS

| | | | | |
|---|---|---|---|---|
| 5,835,667 A | * | 11/1998 | Wactlar et al. | 386/241 |
| 6,243,093 B1 | * | 6/2001 | Czerwinski et al. | 715/848 |
| 7,051,291 B2 | * | 5/2006 | Sciammarella et al. | 715/838 |
| 7,712,052 B2 | * | 5/2010 | Szeliski et al. | 715/854 |
| 8,230,359 B2 | * | 7/2012 | Robertson et al. | 715/801 |
| 8,281,244 B2 | * | 10/2012 | Neuman et al. | 715/716 |
| 2005/0086612 A1 | * | 4/2005 | Gettman et al. | 715/848 |

OTHER PUBLICATIONS

Jungle Storm Animated Wallpaper, http://www.lisisoft.com/free-download-version/137061-jungle-storm-animated-wallpaper, Mar. 21, 2008, p. 1.*
Jungle Waterfall Animated Wallpaper, http://www.sharewarebay.com/Desktop/Themes_&_Wallpaper/AD_Jungle_Waterfall_-_Animated_Desktop_Wallpaper.html, Mar. 30, 2005, pp. 1-2.*

* cited by examiner

*Primary Examiner* — Stephen Hong
*Assistant Examiner* — James G Pohlman

(57) ABSTRACT

Exemplary media content user interface systems and methods are disclosed herein. An exemplary method includes a media content access subsystem displaying a plurality of display elements representative of a plurality of media content instances and that flow through a graphical representation of a water cycle in accordance with one or more flow heuristics, detecting a user interaction, and dynamically adjusting the flow of the one or more display elements in accordance with the user interaction. Corresponding systems and methods are also disclosed.

25 Claims, 7 Drawing Sheets

MEDIA CONTENT USER INTERFACE SYSTEMS AND METHODS

BACKGROUND INFORMATION

Advances in electronic communications technologies have facilitated widespread distribution of media content. To illustrate, personal computers, handheld devices, mobile phones, set-top box devices, and other media content access devices are increasingly being used to access, store, download, share, and/or otherwise process various types of media content (e.g., video, audio, photographs, and/or multimedia).

In some instances, these media content access devices present one or more media content user interfaces to facilitate a user's access to media content. Unfortunately, however, traditional media content user interfaces can be rigid and unintuitive as well as lack customization or personalization. For example, many traditional media content user interfaces have a grid-like format that limits what is displayed, how it is displayed, where it is displayed, and how content is discovered by a user. In addition, many traditional media content user interfaces are standardized and do not take into account differing preferences between users or a user's own changing preferences, traits, and moods. As a result, the process of browsing traditional media content user interfaces may seem constricted, unintuitive, and/or impersonal for users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
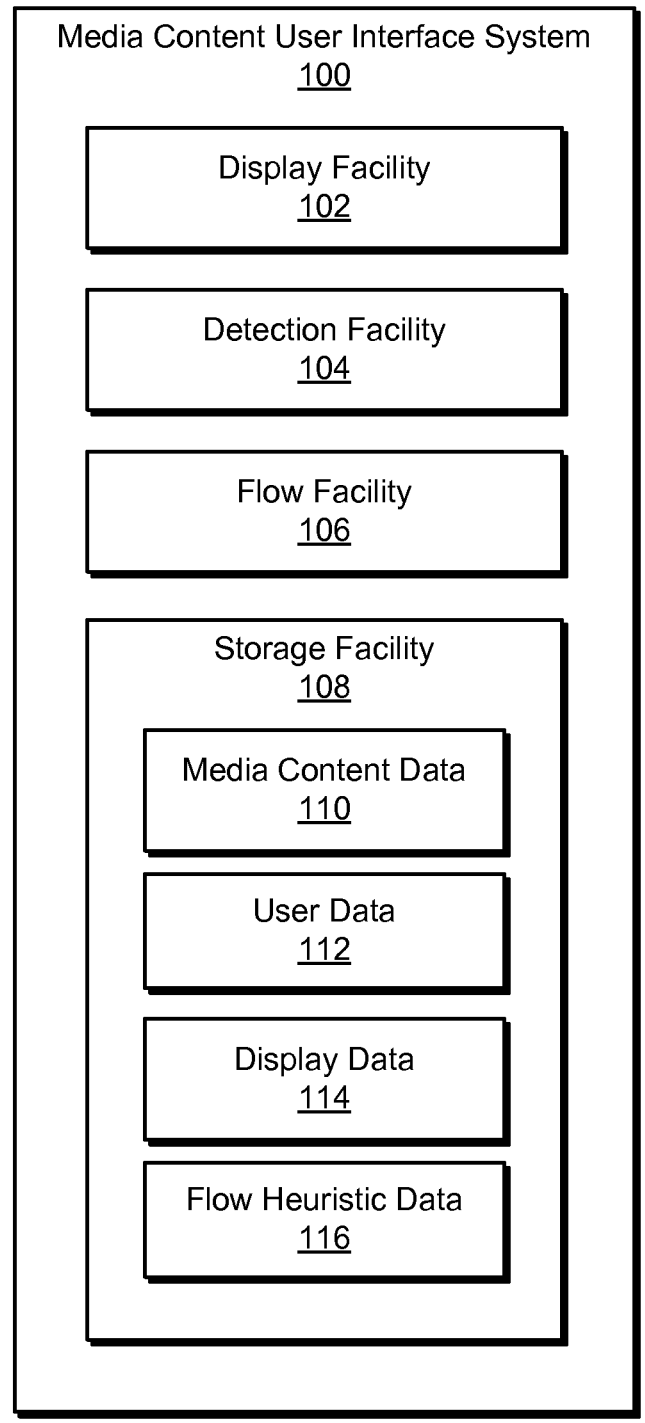
FIG. 1 illustrates an exemplary media content user interface system according to principles described herein.

Exemplary media content user interface systems and methods are disclosed herein. As described in more detail below, an exemplary method may include a media content access subsystem displaying a plurality of display elements that flow through a graphical representation of a water cycle in accordance with one or more flow heuristics. In some examples, the plurality of display elements may be representative of a plurality of media content instances. The exemplary method may further include the media content access subsystem detecting a user interaction and dynamically adjusting the flow of the one or more display elements in accordance with the user interaction. In this or a similar manner, the exemplary systems and methods described herein may provide an entertaining and intuitive media content user interface configured to facilitate a user's discovery of media content in a personalized manner. Additional or alternative media content user interface methods and systems are also disclosed herein.

As will be described in more detail below, in certain implementations, the methods and systems disclosed herein may be configured to provide a user with a media content interface including an immersive virtual environment by way of which a user can navigate and discover media content. In some examples, the methods and systems disclosed herein may be configured to provide a customized media content user interface to a user by way of which media content is made available in way that is unique to the user and/or in accordance with the user's unique user profile, preferences, interactions, and/or desires. Additionally or alternatively, the methods and systems disclosed herein may be self-learning over time and may be configured to dynamically adjust a user's media content user interface in accordance with the user's changing preferences, traits, and/or moods. Additional benefits and/or advantages will be apparent from the details disclosed herein.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, image, photograph, sound, or any segment, component, or combination of these or other forms of media content that may be viewed or otherwise experienced by a user.

A media content instance may include and/or be associated with one or more media content characteristics. As used herein, the term "media content characteristic" or "characteristic" may refer generally to any characteristic or attribute of a media content instance. As will be explained in more detail below, the characteristics of a media content instance may provide valuable information that may be utilized to provide customized/personalized media content user interfaces and/or recommendations for a user. For example, a media content characteristic may include a genre, a person (e.g., a particular actor, artist, etc.), a time (e.g., a release time, a time during which the media content instance is available, etc.), a quality (e.g., a video, audio, or image quality), a size, a mood, a location, a format, and/or any other suitable characteristic. To illustrate, exemplary characteristics of a song may include a title of the song, a name of the song's artist or composer, a name of the song's album, a genre of the song, a length of the song, a rating of the song, an instrumentation of the song, a structural composition of the song, an audio quality of the song, a rhythm of the song, lyrical content of the song, a tonality of the song, and/or any other characteristic corresponding to the song. Exemplary characteristics of a video (e.g., a television program, a film, a home movie, etc.) may include a title of the video, a name of one or more actors, directors, and/or producers associated with the video, a rating of the video (e.g., a user rating, a critic rating, etc.), a synopsis of the video, a genre of the video, a setting of the video, a theme of the video, a format of the video, a quality of the video, a resolution of the video, a size of the video, a time or date associated with the video (e.g., time or date of production, time or date of release, etc.), a color content of the video, a frame rate of the video, a bit rate of the video, an aspect ratio of the video, a compression of the video, a codec associated with the video, and/or any other suitable characteristic of the video. Exemplary characteristics of an image (e.g., a photograph) may include a description of the image, a location associated with the image, a name of one or more persons appearing in the image, a name of a photographer associated with the image, a size of the image, a format of the image, a quality of the image, a resolution of the image, a color content of the image, and/or any other suitable characteristic of the image. In additional or alternative examples, a media content instance may include and/or be associated with any other suitable characteristics.

A media content instance may be associated with metadata. As used herein, the term "metadata" may refer generally to any electronic data descriptive of media content instances and/or corresponding characteristics. Metadata may include, but is not limited to, time data, physical location data, user data, source data, destination data, size data, creation data, modification data, access data (e.g., play counts), and/or any other data descriptive of media content instances and/or corresponding characteristics.

As used herein, the term "media content user interface" may refer generally to any user interface configured to allow a user to browse, discover, and/or access media content and/or associated information. For example, a media content user interface may include a graphical user interface by way of which a user may discover, access, and/or experience media content. Exemplary media content user interfaces are described herein.

As used herein, the term "display element" refers to text (e.g., one or more words, characters, numbers, symbols, etc.), one or more images, one or more videos, one or more graphics, animation content (e.g., Flash content), one or more hyperlinks, and/or any other content that may be visually displayed in a media content user interface and that may be representative of a media content instance. In some examples, a display element representative of a particular media content instance may include a thumbnail image associated with the particular media content instance (e.g., a thumbnail image of a photograph, of album cover artwork, and/or of a frame of a video).

As used herein, the term "user profile" may refer to any suitable information associated with a user. For example, a user profile may include a set of data representing information associated with a user's personal traits, preferences, settings, age, gender, income level, profession, family status, nationality, preferred genre of media content, media content viewing tendencies, etc.

As used herein, a "social media outlet" may refer generally to any system, network, and/or outlet configured to facilitate interaction and/or the distribution of communications and/or content between one or more users. For example, social media outlets may include Internet-based applications configured to facilitate interaction between users. Exemplary social media outlets may include collaborative projects (e.g., Wikipedia), social networking sites (e.g., Myspace, Twitter, Facebook), media sharing sites (e.g., Flickr, YouTube), review/opinion sharing sites (e.g., epinions, WikiAnswers), Internet forums, blogs (e.g., weblogs, social blogs, microblogs), content communities, virtual game worlds, virtual communities, and/or any other type of social media outlet. Social media outlets may be configured to facilitate the distribution of posts (e.g., wall postings, blog postings), email, instant messages, media content, and/or any other suitable communications or other content. A user may utilize a social media outlet to connect, network, and/or communicate with social media contacts. As used herein, the term "social media contact" may refer generally to any person (e.g., family member, friend, colleague, an individual having shared interests with a user, and/or any other suitable person) linked to a user by way of one or more social media outlets. For example, a social media contact may include a Facebook friend, a Twitter follower, a YouTube subscriber, and/or any other suitable social media contact.

As used herein, the terms "enhanced content" and "enhanced content instance" may include, but are not limited to, an advertisement, a promotional offer, interactive content, a video (e.g., a trailer, a video clip, etc.), an article (e.g., an online newspaper article), music, a map, a web page, a web-based search results list (e.g., a Google search results list), and/or any other content as may serve a particular implementation. In some examples, enhanced content may be associated with media content (e.g., may be associated with one or more characteristics of a media content instance).

FIG. 1 illustrates an exemplary media content user interface system 100 (or simply "system 100"). As will be described in more detail below, system 100 may be configured to provide a media content user interface configured to facilitate a user's navigation and/or discovery of media content in a personalized and/or customized manner.

System 100 may include, but is not limited to, a display facility 102, a detection facility 104, a flow facility 106, and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Display facility 102 may be configured to generate, manage, and/or provide a media content user interface for presentation to and/or interaction by a user. In some examples, the media content user interface may include a virtual environment by way of which a user may navigate, discover, and/or access media content. In additional or alternative examples, the media content user interface may be customized and/or personalized for a particular user or group of users. To illustrate, display facility 102 may be configured to display, by way of a graphical user interface, a plurality of display elements (e.g., display elements representative of a plurality of media content instances) that flow through a graphical representation of a water cycle in accordance with one or more flow heuristics. In some examples, the graphical representation of the water cycle may be displayed within a virtual environment (e.g., a three-dimensional virtual world) that a user may interact with and/or navigate to discover and access available media content. Additionally or alternatively, the display elements may flow through the graphical representation of the water cycle in a way that is appealing, intuitive, customized, and/or personalized to the user. Furthermore, the manner in which the display elements flow through the graphical representation of the water cycle may be dynamically adjusted in accordance with a user's preferences, moods, viewing tendencies, and/or interactions with the media content user interface, as will be explained in more detail below.

Detection facility 104 may be configured to detect one or more user interactions. For example, detection facility 104 may be configured to detect a user's interaction with a media content user interface (e.g., a media content user interface displayed by display facility 102), a particular media content instance (e.g., a user's viewing and/or rating of the particular media content instance), a media content access device (e.g., a set-top box device, a tablet computer, a mobile phone device, etc.), an input device (e.g., a touch screen, a remote control device, etc.), a display element (e.g., a display element displayed by display facility 102), and/or a social media outlet. In additional or alternative examples, detection facility 102 may be configured to detect any other suitable user interaction in any other suitable manner, as will be explained in more detail below.

Flow facility 106 may be configured to manage the flow of display elements (e.g., display elements representative of corresponding media content instances) within a media content user interface. For example, flow facility 106 may be configured to manage and/or control the distribution of display elements within a media content user interface, the positions of display elements within a media content user interface, the movement of display elements within a media content user interface, whether and when a particular display element is displayed within a media content user interface, and/or any other aspect associated with the display, timing, and/or movement of display elements within a media content user interface. In some examples, flow facility 106 may be configured to manage the flow of display elements through a graphical representation of a water cycle (e.g., as displayed by display facility 102).

Flow facility 106 may be configured to dynamically adjust the flow of display elements within a media content user interface. To illustrate, flow facility 106 may be configured to dynamically adjust the movement and/or position of a particular display element and/or dynamically adjust the operation of a particular flow heuristic in accordance with and/or in response to a user interaction and/or other information detected or obtained by detection facility 104, as will be explained in more detail below.

Storage facility 108 may be configured to maintain media content data 110 representative of one or more media content instances, user data 112 representative of information associated with one or more users (e.g., user profile information, user preferences information, user interaction information, social media contact information, etc.), user interface data 114 representative of one or more user interfaces including data representative of one or more display elements configured to flow through a graphical representation of a water cycle, and flow heuristic data 116 representative of one or more flow heuristics configured to govern the flow of one or more display elements through a water cycle displayed within a user interface. Storage facility 108 may be configured to maintain additional or alternative data as may serve a particular implementation.

Figure 2:
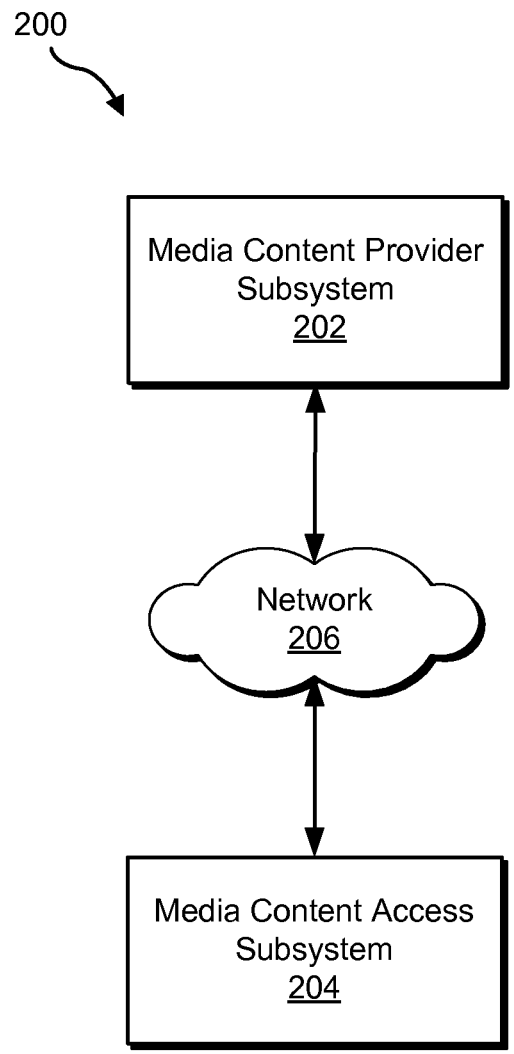
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, display facility 102, detection facility 104, flow facility 106, and storage facility 108 may each be implemented on one or both of provider subsystem 202 and access subsystem 204.

Provider subsystem 202 and access subsystem 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies (e.g., 4G technologies), wireless communication technologies, in-band and out-of-band signaling technologies, and other suitable communications networks and technologies.

In certain embodiments, provider subsystem 202 and access subsystem 204 may communicate via a network 206, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between provider subsystem 202 and access subsystem 204. Communications between provider subsystem 202 and access subsystem 204 may be transported using any one of the above-listed networks, or any combination or sub-combination of the above-listed networks.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

Provider subsystem 202 may be configured to generate or otherwise provide media content (e.g., in the form of one or more media content streams including one or more media content instances) to access subsystem 204. In additional or alternative examples, provider subsystem 202 may be configured to provide a user with data representative of information and/or content associated with the user's social media contacts and/or corresponding social media outlets. Provider subsystem 202 may be further configured to provide access subsystem 204 with access to enhanced content (e.g., advertisements, promotional offers, games, interactive content, etc.).

Access subsystem 204 may be configured to facilitate access by a user to media content made available by provider subsystem 202. To this end, access subsystem 204 may present (e.g., by way of a display screen or display device associated with and/or included in access subsystem 204) a media content user interface to the user, present (e.g., display) a media content instance for experiencing (e.g., viewing) by the user, facilitate the recording of a media content instance for later playback by the user, and/or analyze data associated with media content (e.g., analyze characteristics and/or metadata associated with the media content) to personalize and/or customize the delivery of the media content to the user.

Provider subsystem 202 may be implemented by one or more computing devices. For example, provider subsystem 202 may be implemented by one or more server devices. Additionally or alternatively, access subsystem 204 may be implemented as may suit a particular implementation. For example, access subsystem 204 may be implemented by one or more media content access devices, which may include, but are not limited to, a set-top box device, a DVR device, a media content processing device, a communications device, a mobile access device (e.g., a mobile phone device, a handheld device, a laptop computer, a tablet computer, a personal-digital assistant device, a camera device, etc.), a personal computer, a gaming device, a television device, and/or any other device configured to perform one or more of the processes and/or operations described herein. In some examples, access subsystem 204 may include and/or be associated with any suitable input device (e.g., a touch screen, a mouse, a keyboard, a remote control device, etc.) configured to allow a user to interact with and provide user input to access subsystem 204.

In certain embodiments, system 100 may be implemented entirely by or within provider subsystem 202 or access subsystem 204. In other embodiments, components of system 100 may be distributed across provider subsystem 202 and access subsystem 204. For example, access subsystem 204 may include a client (e.g., a client application) implementing one or more of the facilities of system 100. To illustrate, display facility 102 may utilize access subsystem 204 to display a media content user interface to a user, detection facility 104 may be configured to detect one or more user interactions with access subsystem 204, and flow facility 106 may be configured to dynamically adjust the flow of the display elements within the displayed media content user interface in accordance with the detected user interactions.

Figure 3:
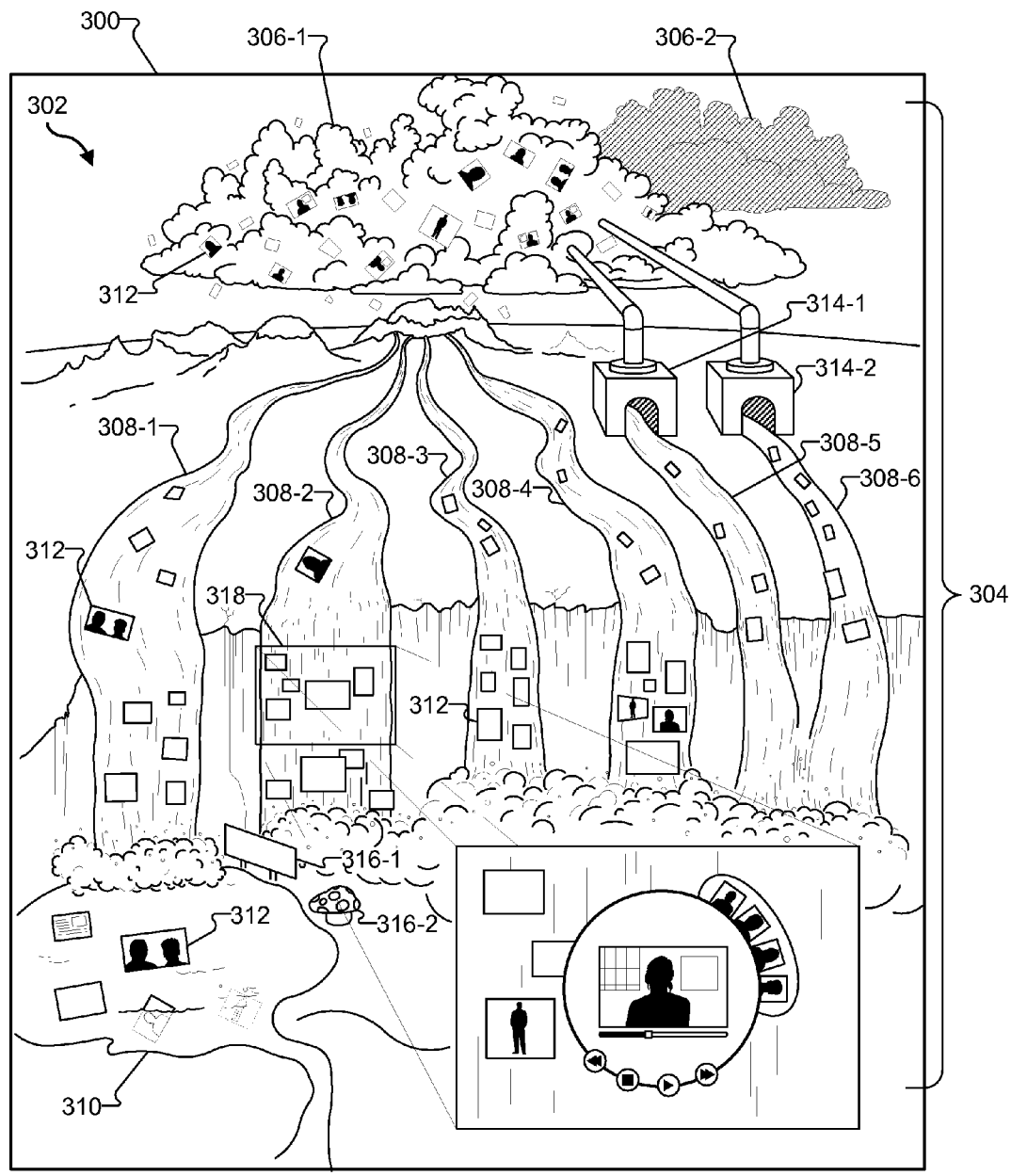
FIGS. 3-4 illustrate views of an exemplary media content user interface according to principles described herein.
Figure 4:
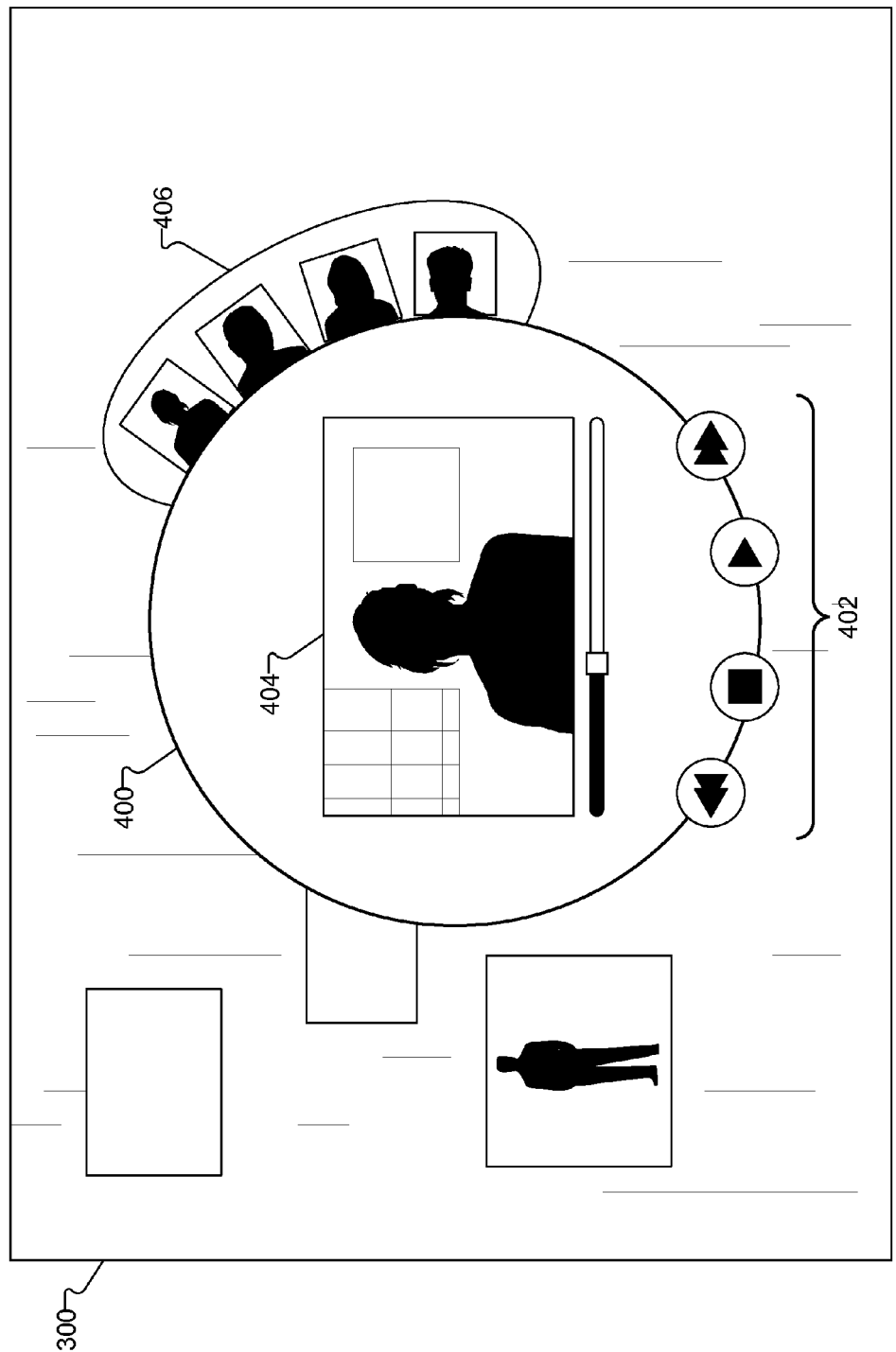

Facilities 102-108 of system 100 will now be described in more detail in conjunction with FIGS. 3-4. FIGS. 3-4 illustrate exemplary views of a media content user interface in the form of a graphical user interface ("GUI") 300 that may be generated, managed, and/or provided by system 100. In some examples, GUI 300 may be displayed on a display screen associated with access subsystem 204. A user may interact with GUI 300 using any suitable input device associated with access subsystem 204. It will be recognized that GUI 300 and the exemplary views shown in FIGS. 3-4 are merely illustrative and that they may be modified, redacted, or added to in any way as may serve a particular implementation.

As mentioned above, display facility 102 may be configured to generate, manage, and/or provide a media content user interface. To illustrate, display facility 102 may be configured to generate, manage, display, and/or provide GUI 300 by way of a display screen associated with a media content access device (e.g., a tablet computer). In some examples, GUI 300 may be configured to facilitate a user's navigation, discovery, and/or access of media content and/or corresponding information, as will be explained in more detail below. Display facility 102 may be configured to provide GUI 300 in any suitable manner as may serve a particular implementation.

As shown in FIG. 3, GUI 300 may include a graphical representation of a virtual world 302. In some examples, virtual world 302 may represent a virtual environment similar in appearance to a physical world. For example, virtual world 302 may have one or more characteristics that are similar to characteristics of Earth. For example, virtual world 302 may include graphical representations of topography, terrain, structures, ecosystems (e.g., including plant and/or animal life), climates, weather, and/or any other suitable characteristics similar to those of Earth. In additional or alternative examples, virtual world 302 may include elements and/or characteristics of any other physical and/or fictional worlds. In some examples, the appearance and/or configuration of virtual world 302 may be user configurable. For example, a user may selectively customize the look, feel, structure, appearance, and/or any other suitable attributes of virtual world 302.

Although a particular exemplary view of virtual world 302 is shown in FIG. 3, one will appreciate that virtual world 302 may extend beyond the view shown in FIG. 3. For example, virtual world 302 may extend in one or more directions beyond the view shown in FIG. 3. In some examples, virtual world 302 may be at least partially three-dimensional, thereby providing a user with a three-dimensional virtual environment that simultaneously extends in multiple directions from the view shown in FIG. 3. Additionally or alternatively, virtual world 302 may be one of a plurality of virtual worlds accessible by way of GUI 300 and/or associated with one or more users.

GUI 300 may be user navigable. For example, GUI 300 may be configured to allow a user to selectively navigate virtual world 302. To illustrate, display facility 102 may be configured to allow a user to alter the view shown in GUI 300 to move around virtual world 302, discover additional virtual worlds, access content available by way of virtual world 302, and/or navigate virtual world 302 in any other suitable manner. In some examples, a user may zoom the view of virtual world 302 presented by way of GUI 300 in and/or out, change a position of the perspective from which the view of virtual world 302 is taken, change an angular direction of the perspective from which the view of virtual world 302 is taken, and/or alter the view of virtual world 302 in any other suitable manner. GUI 300 may be further configured to allow a user navigating virtual world 302 to interact with and/or experience elements and/or content (e.g., media content) included within and/or available by way of virtual world 302, as will be explained in further detail below. GUI 300 may be configured for display on and/or in conjunction with a touch screen (e.g., a touch screen included within a mobile access device, such as a tablet computer). Accordingly, a user may utilize the touch screen to manually navigate virtual world 302 and/or interact with one or more elements of virtual world 302.

As shown in FIG. 3, and as mentioned above, display facility 102 may be configured to display, by way of GUI 300, a graphical representation of a water cycle 304. Water cycle 304 may be configured to graphically and/or virtually represent the movement of water within virtual world 302. Accordingly, water cycle 304 may include any suitable elements associated with the movement/cycling of water. For example, water cycle 304 may include one or more clouds 306-1 and 306-2 (collectively referred to herein as clouds 306) representative of water (e.g., water vapor) collected within the atmosphere of virtual world 302, one or more streams 308-1 through 308-6 (collectively referred to herein as "streams 308") representative of water flowing on the surface of virtual world 302, and one or more pools 310 representative of one or more stationary collections of water on the surface of virtual world 302. In additional or alternative examples, water cycle 302 may include any other suitable collections and/or bodies of water, whether on, above, and/or below the surface of virtual world 302.

As shown in FIG. 3, in conjunction with, in addition to, and/or in place of the water flowing within virtual world 302, display facility 102 may be configured to display a plurality of display elements (an exemplary number of display elements are labeled within FIG. 3 with the reference numeral "312" and the display elements may be collectively and/or individually referred to herein as "display elements 312"). Display elements 312 may include any suitable display elements, such as described herein. In some examples, each display element 312 may be representative of a corresponding media content instance that is available to and/or may be experienced by a user. Additionally or alternatively, one or more of display elements 312 may include thumbnail images (e.g., thumbnail images associated with corresponding media content instances).

A user may utilize GUI 300 to interact with display elements 312. For example, a user may utilize GUI 300 to interact with a particular display element 312 in order to move the particular display element 312 (e.g., from one element of water cycle 304 to another), access information associated with a corresponding media content instance represented by the particular display element 312, and/or experience the corresponding media content instance. In some examples, a user may utilize GUI 300 and/or display elements 312 to access options (e.g., one or more selectable options presented individually, within one or more menus or interfaces, and/or in any other suitable way) associated with the corresponding media content instances. These options may be configured to allow a user to perform any suitable actions associated with the corresponding media content instances. For example, the options may be configured to allow a user to access information (e.g., program guide information, ratings, descriptions, genres, and/or any other suitable information) associated with the corresponding media content instances, experience (e.g., by way of one or more playback options) the corresponding media content instances, place the corresponding media content instances in a user's viewing queue, schedule the corresponding media content instances for recording, rate the corresponding media content instances, share the corresponding media content instances (e.g., with the user's social media contacts), communicate regarding the corresponding media content instances (e.g., by way of one or more social media outlets), access enhanced content (e.g., an advertisement, a website, interactive content, etc.) associated with the corresponding media content instances, and/or perform any other suitable actions associated with display elements 312 and/or the corresponding media content instances.

As mentioned above, display facility 102 may be configured to display display elements 312 flowing through water cycle 302. For example, display facility 102 may be configured to display display elements 312 moving on top of, within, and/or between clouds 306, streams 308, and/or ponds 310. In some examples, display facility 102 may display a single display element 312 flowing and/or present within different portions of water cycle 304 at different times and/or display duplicate display elements 312 (e.g., display elements 312 representative of the same media content instance) flowing and/or present within different portions of water cycle 304 at the same time. As will be explained in more detail below, the flow of display elements 312 through water cycle 304 may be adjusted (e.g., by flow facility 106) in any suitable manner as may serve a particular implementation (e.g., to customize and/or personalize the delivery and/or discovery of display elements 312).

In some examples, display elements 312 may flow through water cycle 304 in accordance with one or more flow heuristics. The one or more flow heuristics may be configured to control, govern, and/or filter the flow of display elements 312 through water cycle 304. For example, the one or more flow heuristics may govern when, where, and how display elements flow within and/or between clouds 306, streams 308, and/or ponds 310. To illustrate, the one or more flow heuristics may govern when and which display elements 312 located within cloud 306 flow into streams 308, when and which display elements 312 located within streams 308 flow into ponds 310, when and which display elements 312 located within ponds 310 flow back into cloud 306, and/or when and which display elements 312 flow through water cycle 304 in any other suitable manner.

The one or more flow heuristics may be based on and/or utilize any suitable information to govern the flow of display elements 312. For example, the one or more flow heuristics may be based on information associated with media content instances (e.g., information regarding the characteristics of the media content instances), information associated with a user (e.g., user profile information, the user's viewing history, the user's viewing queue, the user's schedule of recordings, a geographic location of the user, etc.), information associated with a user's social media contacts (e.g., user profiles associated with the social media contacts, communications to/from the social media contacts, current and/or past activities of the social media contacts, preferences of the social media contacts, etc.), information associated with third parties (e.g., critic's ratings/reviews of media content instances), and/or any other suitable information.

The one or more flow heuristics may be configured to govern the flow of display elements 312 through water cycle 304 in any suitable manner. In some examples, each flow heuristic may specify one or more flow conditions to be satisfied in order for a corresponding display element 312 to flow by way of the flow heuristic. The one or more flow conditions may include any suitable requirements associated with any suitable information. In some examples, an exemplary flow heuristic may specify one or more flow conditions associated with media content characteristics. For example, an exemplary flow condition may require that a media content instance include and/or be associated with one or more specified characteristics before the flow condition is satisfied. To illustrate, an exemplary flow condition may require that a media content instance be associated with a particular genre (e.g., comedy) and/or include a particular actor (e.g., Julia Roberts) before the flow condition is satisfied. In additional or alternative examples, an exemplary flow heuristic may specify one or more flow conditions associated with time. To illustrate, an exemplary flow condition may specify a particular date (e.g., month, day, and/or year), time of day, and/or amount of time (e.g., elapsed time within a particular stream 308 or pool 310) that must pass before the flow condition is satisfied. In yet additional or alternative examples, an exemplary flow heuristic may specify one or more flow conditions associated with one or more social media outlets and/or social media contacts. To illustrate, an exemplary flow condition may require that one or more of a user's social media contacts view and/or recommend (e.g., "like") a particular media content instance for the flow condition to be satisfied. The foregoing examples are provided for illustrative purposes only and are not limiting. In further embodiments, the one or more flow heuristics may specify any suitable additional and/or alternative flow conditions.

The one or more flow heuristics may be defined by any suitable party and/or at any suitable time. For example, an exemplary flow heuristic may be predefined by a provider of system 100. Additionally or alternatively, the one or more flow heuristics may be user defined. For example, a user may selectively modify one or more existing flow heuristics and/or create one or more additional flow heuristics.

In some examples, the one or more flow heuristics may include at least one self-learning flow heuristic. For example, a self-learning heuristic may be configured to dynamically adapt and learn based on user interactions, user inaction, and/or on changes in a user's preferences, profile, traits, mood, etc., as will be explained in more detail below. Accordingly, the self-learning flow heuristic may be able to dynamically govern the flow of display elements 312 in a way that is personalized, customized, and/or intuitive to a user.

The one or more flow heuristics may be selectively associated with each other. For example, a particular flow heuristic may be independent of other flow heuristics (e.g., the flow heuristic does not require the satisfaction of other flow heuristics) or may be dependent on one or more other flow heuristics (e.g., the flow heuristic requires the satisfaction of the one or more other flow heuristics).

As mentioned above, water cycle 304 may include one or more clouds 306. Although GUI 300 illustrates water cycle 304 including two clouds, one will appreciate that water cycle 304 may include any other suitable number of clouds 306 (e.g., less or more than two). Clouds 306 may be configured to have any suitable appearance and/or structure. For example, clouds 306 may be configured to be similar in appearance to actual clouds. Each of clouds 306 may include a plurality of display elements 312 (e.g., floating within clouds 306). In some examples, each of clouds 306 may include display elements 312 associated with a particular collection of media content (e.g., stored within a particular file or at a particular location), a particular type of media content (e.g., music, videos, photos, user-generated media content, etc.), a particular source of media content (e.g., a service provider, a social media contact, the user herself, etc.), and/or a combination thereof (e.g., all available media content). To illustrate, cloud 306-1 may include display elements 312 representative of video content (e.g., broadcast video content, video-on-demand content, etc.) available by way of a user's television service provider and cloud 306-2 may include display elements 312 representative of media content owned and/or generated by the user (e.g., the user's photos, music, home videos, etc.). In some examples, a user may selectively activate and/or deactivate clouds 306 to access corresponding display elements 312 and/or media content. For example, a user may move cloud 306-2 into the place of cloud 306-1 to facilitate the flow of display elements 312 within cloud 306-2 through water cycle 304. In additional or alternative examples, each of clouds 306 may be associated with distinct sets of streams 308 and/or pools 310 between which a user may navigate to discover and/or access corresponding media content. Each of clouds 306 may be additionally or alternatively associated with distinct flow heuristics configured to uniquely govern the flow of display elements 312 into, within, and/or out of each of clouds 306.

In accordance with the corresponding flow heuristics, display elements 312 may flow (e.g., "rain down") from clouds 306 and into streams 308. Although GUI 300 illustrates water cycle 304 including six streams, one will appreciate that water cycle 304 may include any other suitable number of streams (e.g., less or more than six). The structure, appearance, size, and/or direction of streams 308 may be configured as desired for a particular implementation. For example, as shown in FIG. 3, streams 308 may originate near one or more mountains within virtual world 302, flow through the landscape of and over a cliff (e.g., thereby creating corresponding waterfalls) in virtual world 302, and terminate by flowing into pools 310.

Display elements 312 included in streams 308 may flow and/or circulate through streams 308 in any suitable manner and/or for any suitable amount of time. For example, one or more of display elements 312 included a particular stream 308 may flow and/or circulate through the particular stream 308 until, whether in accordance with one or more flow heuristics or in response to a user request, the display elements 312 flow to another portion of water cycle 304. As will be explained in more detail below, a user may utilize streams 308 to discover and/or interact with corresponding display elements 312 and/or media content instances.

As mentioned above, the flow of display elements 312 from clouds 306 into streams 308 may be governed by one or more flow heuristics. In some examples, each of streams 308 may be associated with one or more unique flow heuristics. As a result, each of streams 308 may include a unique group of display elements 312 representative of media content instances that are associated with and/or similar to each other (e.g., media content instances having one or more common characteristics). To illustrate, stream 308-1 may include display elements 312 representative of media content instances that will be available to the user in the future, stream 308-2 may include display elements 312 representative of media content instances that are specifically recommended for the user (e.g., based on the user's preferences, viewing tendencies, ratings, etc.), stream 308-3 may include display elements 312 representative of media content instances associated with a particular genre (e.g., action), and/or stream 308-4 may include display elements 312 representative of media content instances that have recently been viewed, are currently being viewed, and/or have been recommended by one or more of the user's social media contacts. Accordingly, a user may selectively navigate between the different streams 308 to discover corresponding display elements 312 and/or access corresponding media content.

A stream 308 may have one or more branches by way of which the flow/distribution of display elements 312 within the stream 308 may be further divided, refined, and/or filtered. In some examples, each branch of a stream 308 may be associated with one or more corresponding flow heuristics that govern which branch a particular display element 312 follows. For example, a particular stream 308 may be associated with and include display elements 312 representative of a particular "genus" of media content and each branch of the stream 308 may be associated with and include display elements 312 representative of media content from a particular "species" within the genus. To illustrate, a particular stream 308 may be associated with and only include display elements 312 representative of movies including a particular actor (e.g., Arnold Schwarzenegger). The particular stream 308 may fork into two branches including a first branch associated with and including display elements 312 representative of movies released during a particular time period (e.g., released during the '90s) and a second branch associated with and including display elements 312 representative of movies that were not released during the particular time period. Further downstream, either or both of the two branches may split into three additional branches including a first additional branch associated with and including display elements 312 representative of movies of a first genre (e.g., action), a second additional branch associated with and including display elements 312 representative of movies of a second genre (e.g., comedy), and a third additional branch associated with and including display elements 312 representative of movies of neither of the first or second genres. Accordingly, a user may narrow and/or refine their search/discovery of media content by selectively navigating between the different branches of a stream 308. In additional or alternative examples, a stream 308 may divide into any other suitable number of branches, at any suitable locations along the stream 308, and/or in accordance with any suitable flow heuristics, as may serve a particular implementation.

Streams 308 may be user configurable. For example, a user may modify, create, and/or remove one or more of streams 308. To illustrate, a user may be interested in a particular sport (e.g., golf) and may create a stream 308, along with one or more corresponding flow heuristics, configured to deliver display elements 312 representative of media content instances associated with the particular sport (e.g., golfing events, instructional golfing videos, etc.) to the user. In additional or alternative examples, a user may be allowed to configure the appearance, size, path, and/or characteristics of streams 308, and/or configure streams 308 in any other suitable manner.

As shown in FIG. 3, virtual world 302 may include virtual plumbing facilities 314-1 and 314-2 (collectively referred to herein as "plumbing facilities 314") associated with streams 308-5 and 308-6. In some examples, a user may utilize plumbing facilities 314 to share and/or search for media content in any suitable manner. For example, plumbing facilities 314 and/or streams 308-5 and 308-6 may be representative of display elements 312 and/or corresponding media content being "piped" (e.g., shared) between one or more locations within virtual world 302, between virtual world 302 and one or more additional virtual worlds, and/or between a user and one or more of the user's social media contacts. In additional or alternative examples, plumbing facilities 314 may be representative of one or more media content searches (e.g., initiated by a user) and streams 308-5 and 308-6 may include corresponding display elements 312 resulting from the searches. In some examples, plumbing facilities 314 may be configured to facilitate media content searches of any suitable media content sources, whether or not the sources are included within virtual world 302.

As shown in FIG. 3, in some examples, streams 308 and/or corresponding display elements 312 may flow into corresponding pools 310. Although a single pool 310 is illustrated in FIG. 3, one will appreciate that water cycle 304 may include any suitable number of pools 310 (e.g., one for each of streams 308), as may suit a particular implementation. The flow of display elements 312 from streams 308 into pools 310 may be governed by one or more additional flow heuristics. For example, each of pools 310 may be associated with one or more unique flow heuristics configured to filter when and which display elements 312 flow into pools 310 from streams 308. In some examples, one or more display elements 312 may flow into pools 310 after flowing within one of streams 308 for a predetermined amount of time (e.g., one or more minutes, hours, days, and/or weeks).

Display elements 312 may flow (e.g., float) within pools 310 in any suitable manner and/or for any suitable amount of time, during which time a user may selectively interact with display elements 312 and/or corresponding media content instances. In some examples, after floating within pool 310 for a predetermined amount of time and/or in accordance with one or more corresponding flow heuristics, the display elements 312 within pool 310 may be configured to start to sink and/or drown in pool 310. For example, after a particular display element 312 has floated within pool 310 for a predetermined amount of time without being interacted with by a user, the particular display element 312 may begin to sink below the surface of pool 310. If a display element 312 is allowed to sink/drown entirely, it may be removed from pool 310 and/or returned to cloud 306. Alternatively, a user may "rescue" the sinking display element 312 by moving the display element 312 back to the surface, where it may remain for another predetermined amount of time.

As further shown in FIG. 3, display facility 102 may be configured to display additional display elements 316-1 and 316-2 (collectively referred to herein as "display elements 316") representative of enhanced content instances. Display elements 316 may be positioned nearby (e.g., on the shores of) one or more streams 308 and/or pool 310 and/or may be representative of enhanced content associated with the nearby stream 308 and/or pool 310 (e.g., enhanced content associated with media content represented by display elements 312 within the nearby stream 308 and/or pool 310). To illustrate, display elements 316 may be representative of and/or selectable by a user to access advertisements (e.g., targeted advertisements), promotional offers (e.g., promotional offers available to the user and the user's social media contacts), video games, and/or any other suitable enhanced content associated with one or more display elements 312 and/or corresponding media content instances included in a nearby stream 308 or pool 310. In some examples, display elements 316 may include graphical representations of billboards, signs, and/or any other suitable item associated with and/or providing information regarding an advertisement or available promotion. In some examples, the location, appearance, prominence, structure, and/or other attributes of display elements 316 may be configured to attract a particular type of user and/or advertiser. Additionally or alternatively, display elements 316 and/or corresponding enhanced content may be based on other information associated with the user (e.g., a user's user profile, user preferences, viewing history, etc.) and/or the user's social media contacts. For example, system 100 may utilize user attributes, user demographics, etc. to deliver targeted advertising and/or promotions to users by way of display elements 316. In additional or alternative examples, system 100 may provide tailored advertising opportunities and/or link available advertising to particular media content characteristics and/or other attributes in order to attract certain advertisers.

As mentioned above, detection facility 104 may be configured to detect one or more user interactions. As used herein, the term "user interaction" may include any suitable user commands, user inputs, user communications, interactions with media content, and/or any other suitable user interactions. Detection facility 104 may be configured to detect the user interactions in any suitable manner.

In some examples, detection facility 104 may be configured to detect one or more user interactions within GUI 300. For example, detection facility 104 may be configured to detect a navigation of GUI 300 by a user, an interaction with one or more of display elements 312 (e.g., a selection of one or more of display elements, a repositioning of one or more of display elements 312 within water cycle 304, a rescuing of one or more of display elements 312 within pools 310, etc.), a selection of one or more selectable options (e.g., one or more selectable options associated with a display element 312 or corresponding media content instance), an interaction with a media content instance (e.g., a playback of the media content instance), an interaction with a media content access device presenting GUI 300 (e.g., an interaction with an input device associated with the media content access device), a creation or modification of one or more elements within water cycle 304, a creation or modification of one or more flow heuristics, and/or any other suitable interactions with GUI 300 and/or corresponding media content access devices.

In additional or alternative examples, the user interaction may include any other suitable interaction with any other suitable interface, software application, device, system, service provider, content (e.g., media content or enhanced content), database, and/or person. For example, the user interaction may comprise an interaction with a separate user interface (e.g., separate from GUI 300), a social media outlet (e.g., a posting provided by way of a social media outlet), a social media contact (e.g., a communication with a social media contact), a separate media content access device (e.g., separate from a media content access device presenting GUI 300, such as a separate set-top box device or mobile phone device), a media content instance (e.g., a viewing of a media content instance independent of GUI 300), a user profile (e.g., a modification of the user's profile or one or more user profiles associated with a user's social media contacts), and/or any other suitable device, software application, interface, database, system, service provider, content, and/or person.

In some examples, a detected user interaction may be an interaction of a user of GUI 300 (e.g., may be performed by the user, may originate from the user, etc.) or may be an interaction of one of the user's social media contacts.

Detection facility 104 may be further configured to obtain and/or maintain data representative of information associated with one or more user interactions. For example, detection facility 104 may be configured to monitor and/or track one or more user interactions, keep a record of the one or more user interactions, maintain data representative of content associated with the one or more user interactions, and/or maintain data representative of any other suitable information associated with the one or more user interactions. User interactions detected by detection facility 104 and/or corresponding information obtained by detection facility 104, may be utilized to personalize and/or customize a user's experience with GUI 300, as will be explained in more detail below.

As mentioned above, flow facility 106 may be configured to adjust the flow of display elements through a graphical representation of a water cycle. For example, flow facility 106 may be configured to directly adjust the flow of display elements 312 through water cycle 304. In some examples, flow facility 106 may directly adjust (e.g., in response to a user interaction) the flow of display elements 312 by moving/removing one or more display elements 312 within water cycle 304 (e.g., by moving one or more display elements 312 from one cloud 306 to another, from one stream 308 to another, from one pond 310 to another, from water cycle 304 to another water cycle, and/or between clouds 306, streams 308, and/or ponds 310, and/or by removing the one or more display elements 312 from water cycle 304 and/or virtual world 302). Accordingly, flow facility 106 may allow a user to directly adjust the flow of display elements 312 by, for example, manually moving a particular display element 312 from one of streams 308 to another or to any of clouds 306 or ponds 310.

Flow facility 106 may be additionally or alternatively configured to adjust one or more flow heuristics that govern the flow of display elements 312 through water cycle 304. In some examples, flow facility 106 may be configured to dynamically adjust the one or more flow heuristics in accordance with and/or in response to one or more user interactions and/or corresponding information detected/obtained by detection facility 104. For example, flow facility 106 may be configured to adjust the requirements of one or more flow conditions specified by a flow heuristic to alter the corresponding flow of display elements 312. In some examples, flow facility 106 may be configured to dynamically adjust the one or more flow heuristics in accordance with a user's changing preferences, moods, media content viewing tendencies, etc. To illustrate, in response to a user's request to move a particular display element 312 from stream 318-1 to stream 318-4, flow facility 106 may dynamically adjust one or more flow heuristics associated with stream 318-1 and/or stream 318-4 to thereafter adjust the flow of display elements 312 into stream 318-1 and/or stream 318-4 so that similar display elements 312 (e.g., display elements 312 representative of media content instances having similar characteristics) are more apt to flow into stream 318-4 and/or less apt to flow into stream 318-4. To further illustrate, in response to a user allowing a particular display element 312 to drown within pools 310 without experiencing the corresponding media content instance (e.g., thereby indicating that the user was not interested in the corresponding media content instance), flow facility 106 may be configured to dynamically adjust one or more flow heuristics associated with pools 310 and/or corresponding streams 308 so that similar display elements 312 are less apt to flow into pools 310 and/or so that similar display elements 312 remain in pools 310 for a shorter period of time.

In certain implementations, virtual world 302 may include one or more virtual lifeforms living within virtual world 302 and/or interacting with one or more elements of water cycle 304. For example, virtual world 302 may include one or more virtual animals, virtual people, and/or other suitable virtual lifeforms that live within virtual world 302 and/or interact with streams 308, pools 310, and/or display elements 312 in any suitable manner. In some examples, the actions of the virtual lifeforms and/or the interactions of the virtual lifeforms with virtual world 302 may be altered in accordance with one or more user interactions (e.g., interactions of a user with GUI 300 and/or with media content made available by way of GUI 300). Additionally or alternatively, virtual lifeforms may form, survive, live, and/or die in accordance with user interactions. For example, the existence of a particular group (e.g., colony, herd, etc.) of one or more virtual lifeforms may be dependent on a user's consumption (e.g., viewing) of a particular type of media content. To illustrate, if the user views a large amount of the particular type of media content, the particular group of lifeforms may thrive within virtual world 302. Conversely, if the user decreases or discontinues viewing the particular type of media content, the corresponding group of virtual lifeforms may die out or be conquered by another group of virtual lifeforms (e.g., a group of lifeforms associated with another type of media content). Additionally or alternatively, the survival and/or well-being of virtual world 302 as a whole may depend on user interactions. For example, in certain implementations, virtual world 302 may cease to exist entirely (e.g., virtual lifeforms and/or other elements of virtual world 302 may virtually die off), after which a user could reset virtual world 302 and start anew. In additional or alternative examples, the survival and/or interactions of virtual world 302 and/or corresponding virtual lifeforms may be presented and/or managed in any other suitable manner.

In some examples, virtual world 302 may change based on a detected time of day. For example, an appearance of virtual world 302 may change as the time of day changes (e.g., virtual world 302 may get darker in the evening and lighter in the morning), a display and/or flow of display elements 312 may change as the time of day changes (e.g., the flow and/or display of display elements 312 representative of kid-friendly media content may be more prominent during the day and the flow and/or display of display elements 312 representative of more mature media content may be more prominent during the evening), and/or any other suitable aspect of GUI 300 may change based on a time of day in any other suitable manner as may serve a particular implementation.

The foregoing examples are provided for illustrative purposes only and are not limiting. In additional or alternative examples, flow facility 106 may be configured to adjust the flow of display elements 312 through and/or within water cycle 304 in any other suitable manner and/or in accordance with any other suitable information and/or user interactions. Accordingly, flow facility 106 may be configured to dynamically personalize and/or customize a user's experience with GUI 300 and/or facilitate the self-learning configuration of one or more corresponding flow heuristics.

Additionally or alternatively, although the foregoing examples teach display elements 312 flowing through virtual world 302 in accordance with a metaphor of a water cycle, in further examples, display elements 312 may flow through virtual world 302 in accordance with any other suitable metaphors. For example, display elements 312 may flow through virtual world 302 in accordance with a lava flow metaphor (e.g., with display elements 312 flowing from one or more volcanoes within virtual world 302 and/or through one or more rivers of lava), a gaseous flow metaphor (e.g., with display elements 312 flowing over the surface of virtual world 302 similar to and/or in conjunction with a flow of a supercooled gas), and/or any other suitable liquid and/or gaseous flow metaphors as may serve a particular implementation.

As mentioned above, a user may be allowed to navigate within virtual world 302 in any suitable manner. In some examples, a user may zoom in on any portion of water cycle 304 to view and/or interact with corresponding display elements 312 flowing through that portion of water cycle 304. To illustrate, a user may navigate to and/or zoom in on a portion of water cycle 304 indicated by box 318 to access an enlarged view of that portion of water cycle 304, as shown in FIG. 3. FIG. 4 illustrates an exemplary view of GUI 300 including the enlarged view of the corresponding portion of water cycle 304.

As shown in FIG. 4, as a user zooms in on a particular portion of water cycle 304, the user may be able to view corresponding display elements 312 in more detail. Additionally or alternatively, display facility 102 may be configured to display information and/or options associated with a particular display element 312 and/or the corresponding media content instance (e.g., in response to the user's selection of the particular display element 312). To illustrate, as shown in FIG. 4, display facility 104 may be configured to display a presentation interface 400 to a user (e.g., in response to the user's request to view the corresponding media content instance). In some examples, presentation interface 400 may include one or more playback controls 402 configured to allow the user to control a presentation 404 of the corresponding media content instance. Additionally or alternatively, presentation interface 400 may include social media content 406 including images, information, communications, and/or other content associated with a user's social media contacts. For example, social media content 406 may include images associated with the user's social media contacts that are viewing or have viewed the media content instance being presented by way of presentation interface 400.

Although FIG. 4 shows a presentation of a media content instance by way of GUI 300, one will appreciate that the media content instance may be additionally or alternatively presented by way of a separate media content access device and/or display device. To illustrate, a user may interact with GUI 300 by way of a tablet computer or other mobile computing device and/or utilize GUI 300 to request that the media content instance be presented by way of the user's set-top box device, gaming console, and/or television device. Accordingly, the user may continue to navigate virtual world 302 by way of the tablet computer while the media content instance is being presented by the user's set-top box device.

The exemplary view of FIG. 4 is provided for illustrative purposes only and is not limiting. In additional or alternative examples, display facility 102 may be configured to display any other suitable options, content, and/or information associated with a particular display element 312 and/or a corresponding media content instance, as may serve a particular implementation.

Figure 5:
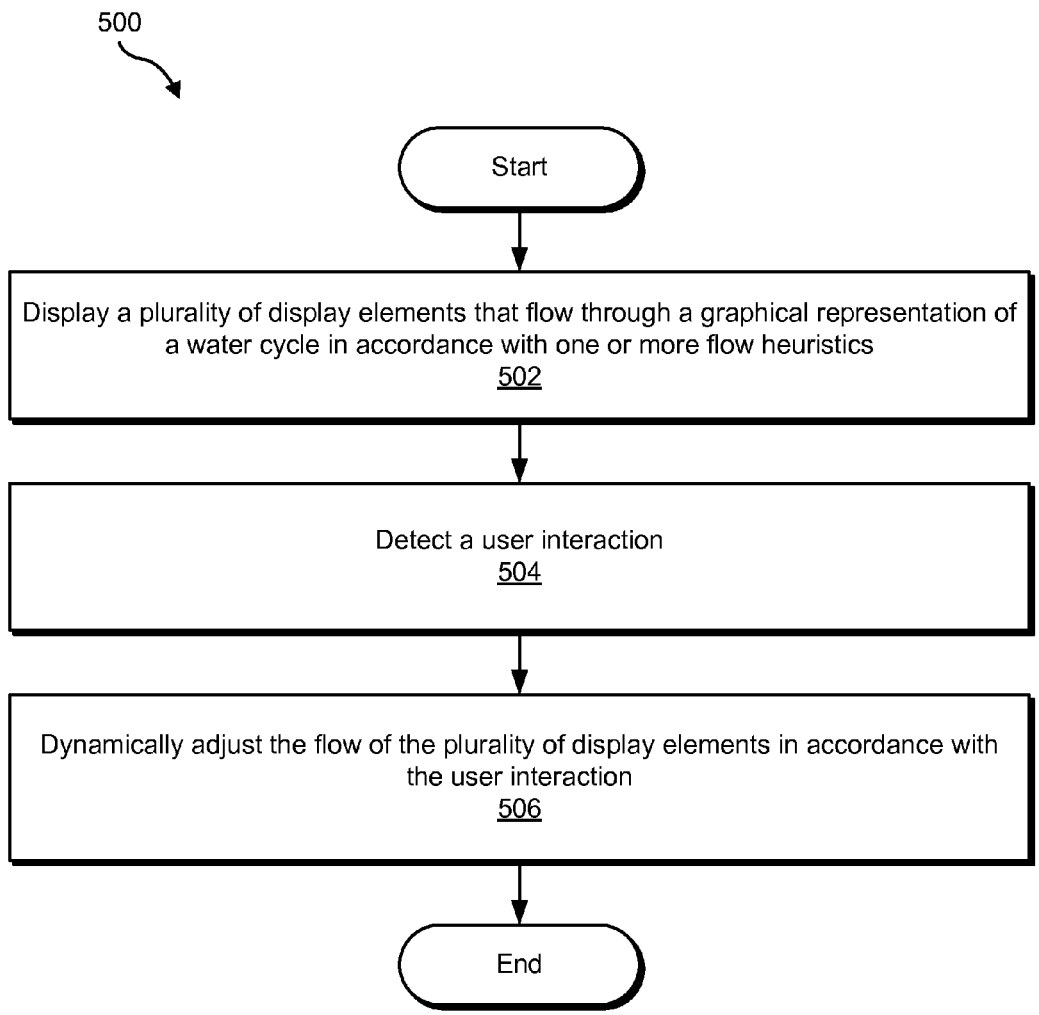
FIG. 5 illustrates an exemplary method for providing a media content user interface according to principles described herein.

FIG. 5 illustrates an exemplary method 500 for providing a media content user interface. While FIG. 5 illustrates exemplary steps according to one embodiment, other embodiments may omit, add to, reorder, and/or modify any of the steps shown in FIG. 5. One or more of the steps shown in FIG. 5 may be performed by any component or combination of components of system 100.

In step 502, a media content access subsystem displays a plurality of display elements that flow through a graphical representation of a water cycle in accordance with one or more flow heuristics. For example, display facility 102 may be configured to display the plurality of display elements in any suitable manner, such as described herein. In some examples, the plurality of display elements may be representative of a plurality of media content instances.

In step 504, the media content access subsystem detects a user interaction. For example, detection facility 104 may be configured to detect the user interaction in any suitable manner, such as described herein.

In step 506, the media content access subsystem dynamically adjusts the flow of the plurality of display elements in accordance with the user interaction. For example, flow facility 106 may be configured to dynamically adjust the flow of the plurality of display elements in accordance with the user interaction in any suitable manner, such as described.

Figure 6:
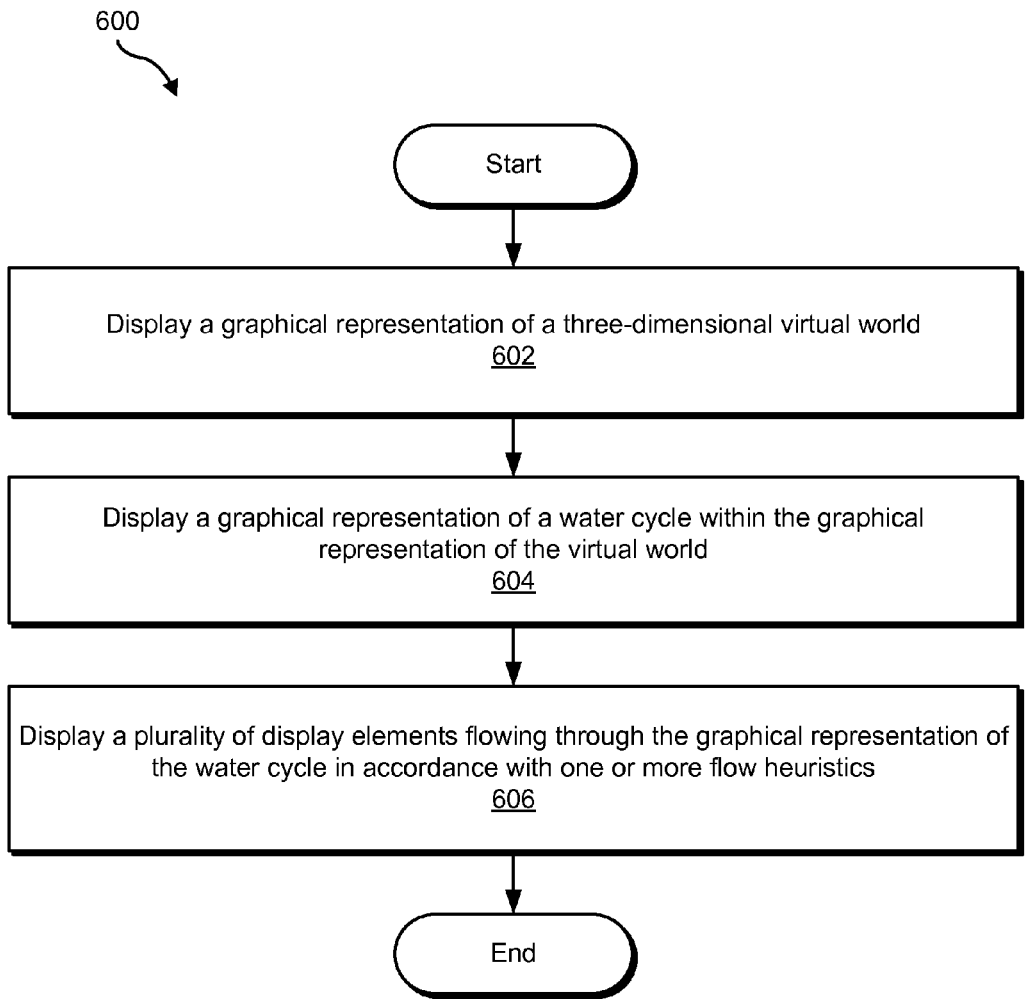
FIG. 6 illustrates another exemplary method for providing a media content user interface according to principles described herein.

FIG. 6 illustrates another exemplary method 600 for providing a media content user interface. While FIG. 6 illustrates exemplary steps according to one embodiment, other embodiments may omit, add to, reorder, and/or modify any of the steps shown in FIG. 6. One or more of the steps shown in FIG. 6 may be performed by any component or combination of components of system 100.

In step 602, a media content access subsystem displays a graphical representation of a three-dimensional virtual world. For example, display facility 102 may be configured to display the graphical representation of a three-dimensional virtual world in any suitable manner, such as described herein.

In step 604, the media content access subsystem displays a graphical representation of a water cycle within the graphical representation of the virtual world. For example, display facility 102 may be configured to display the graphical representation of the water cycle in any suitable manner, such as described herein.

In step 606, the media content access subsystem displays a plurality of display elements flowing through the graphical representation of a water cycle in accordance with one or more flow heuristics. For example, display facility 102 may be configured to display the plurality of display elements flowing through the graphical representation of the water cycle in any suitable manner, such as described herein. In some examples, the plurality of display elements may be representative of a plurality of media content instances. Additionally or alternatively, the one or more flow heuristics may be configured to facilitate a user's discovery of at least one media content instance within the plurality of media content instances in a personalized manner.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read. In certain implementations, a computer-readable medium may be part of an integrated cloud storage or any other data storage system.

Figure 7:
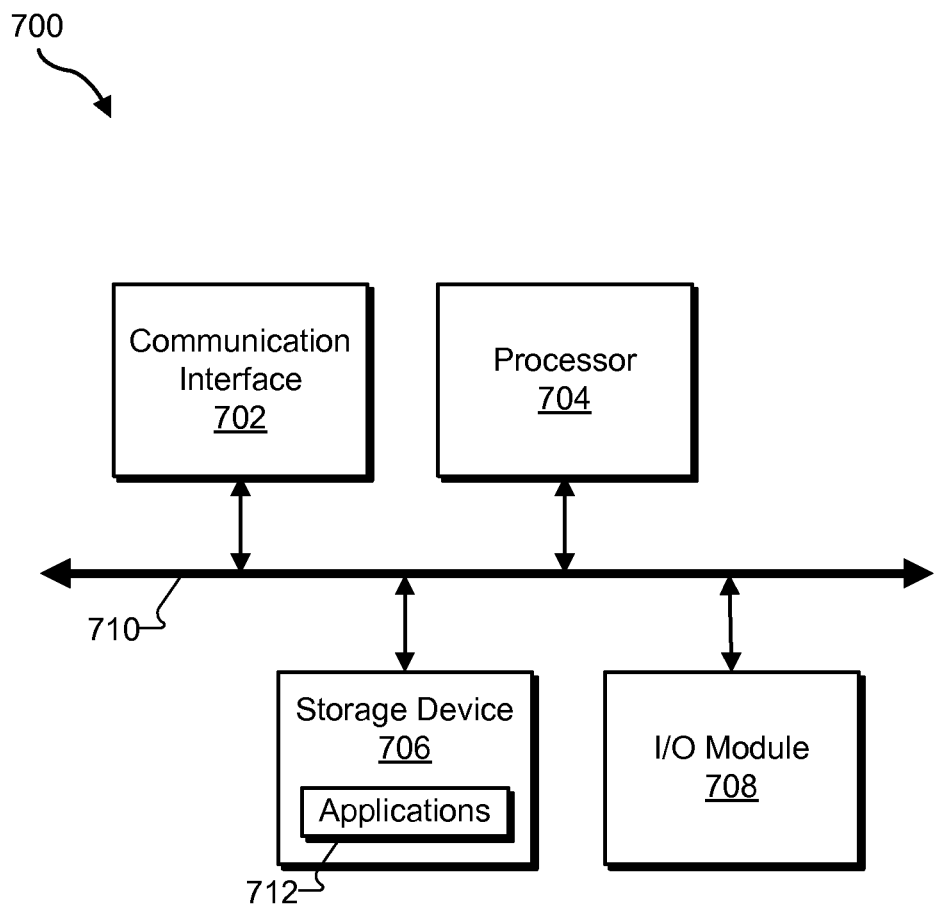
FIG. 7 illustrates an exemplary computing device according to principles described herein.

FIG. 7 illustrates an exemplary computing device 700 that may be configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, and any other suitable interface. In at least one embodiment, communication interface 702 may provide a direct connection between system 100 and one or more provisioning systems via a direct link to a network, such as the Internet. Communication interface 702 may additionally or alternatively provide such a connection through, for example, a local area network (such as an Ethernet network), a personal area network, an LTE network (e.g., a 4G network), a telephone or cable network, a satellite data connection, a dedicated URL, or any other suitable connection. Communication interface 702 may be configured to interface with any suitable communication media, protocols, and formats, including any of those mentioned above.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706. For example, data representative of one or more executable applications 712 (which may include, but are not limited to, one or more of the software applications described herein) configured to direct processor 704 to perform any of the operations described herein may be stored within storage device 706. In some examples, data may be arranged in one or more databases residing within storage device 706.

I/O module 708 may be configured to receive user input and provide user output and may include any hardware, firmware, software, or combination thereof supportive of input and output capabilities. For example, I/O module 708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with display facility 102, detection facility 104, and/or flow facility 106. Likewise, storage facility 108 may be implemented by or within storage device 706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   displaying, by a media content access subsystem by way of a graphical user interface, a plurality of display elements that flow through a plurality of streams within a graphical representation of a water cycle in accordance with one or more flow heuristics,
   wherein each of the plurality of display elements is representative of one of a plurality of media content instances, and
   wherein each of the plurality of streams is controlled at least in part by a different flow heuristic within the one or more flow heuristics such that each of the plurality of streams includes a different group of display elements;
   detecting, by the media content access subsystem, a user interaction; and
   dynamically adjusting, by the media content access subsystem, the flow of the plurality of display elements through the plurality of streams in accordance with the user interaction.

2. The method of claim 1, further comprising displaying, by the media content access subsystem by way of the graphical user interface, a graphical representation of a virtual environment including the water cycle.

3. The method of claim 1, wherein the water cycle is at least partially three-dimensional.

4. The method of claim 1, wherein the graphical representation of the water cycle is user navigable.

5. The method of claim 1, wherein the media content access subsystem comprises a tablet computer including a touch screen.

6. The method of claim 1, wherein the one or more flow heuristics comprise at least one of a predefined flow heuristic, a user-defined flow heuristic, and a self-learning flow heuristic.

7. The method of claim 1, wherein the one or more flow heuristics are based at least partially on a user profile of a user associated with the media content access subsystem.

8. The method of claim 1, wherein the detected user interaction is associated with at least one of the graphical user interface, a particular media content instance within the plurality of media content instances, an input device associated with the media content access subsystem, a particular display element within the plurality of display elements, a social media outlet, and the media content access subsystem.

9. The method of claim 1, wherein the user interaction comprises at least one of a viewing of one of the plurality of media content instances, a rating of one of the plurality of media content instances, a repositioning of one of the plurality of display elements within the graphical user interface, a social media communication, and a modification of a user profile.

10. The method of claim 1, wherein the user interaction is associated with at least one of a user associated with the media content access subsystem and a social media contact of the user.

11. The method of claim 1, wherein each flow heuristic within the one or more flow heuristics specifies one or more flow conditions configured to govern the flow of one or more of the plurality of display elements through a corresponding stream within the plurality of streams.

12. The method of claim 1, wherein displaying the graphical representation of the water cycle comprises:
displaying a graphical representation of at least one cloud, wherein at least one flow heuristic within the one or more flow heuristics is configured to control the flow of one or more display elements within the plurality of display elements from the at least one cloud into at least one stream within the plurality of streams.

13. The method of claim 1, wherein the displaying the graphical representation of the water cycle comprises:
displaying a graphical representation of at least one pool, wherein at least one flow heuristic within the one or more flow heuristics is configured to control the flow of at least one display element within the plurality of display elements from at least one stream within the plurality of streams into the at least one pool.

14. The method of claim 1, further comprising displaying, by the media content access subsystem, one or more selectable options associated with at least one of a particular media content instance within the plurality of media content instances and a particular display element within the plurality of display elements.

15. The method of claim 14, wherein the one or more selectable options comprise at least one of an option to present the particular media content instance, an option to access information associated with the particular media content instance, an option to rate the particular media content instance, an option to place the particular media content instance in a queue, an option to schedule a recording of the particular media content instance, an option to access enhanced content associated with the particular media content instance, and an option to move the particular display element.

16. The method of claim 1, wherein the dynamically adjusting the flow comprises repositioning a particular display element within the graphical representation of the water cycle.

17. The method of claim 1, wherein the dynamically adjusting the flow comprises adjusting at least one flow heuristic within the one or more flow heuristics.

18. The method of claim 17, wherein the adjusting the at least one flow heuristic comprises adjusting an existing flow heuristic or creating a new flow heuristic.

19. The method of claim 1, wherein at least one display element within the plurality of display elements comprises a thumbnail image.

20. The method of claim 1, further comprising displaying, by the media content access subsystem by way of the graphical user interface, one or more additional display elements representative of one or more enhanced content instances.

21. The method of claim 20, wherein the one or more enhanced content instances comprises at least one of an advertisement, a promotional offer, and a game associated with at least one of one or more of the plurality of media content instances, a user associated with the media content access subsystem, and a social media contact of the user.

22. The method of claim 1, embodied as computer-executable instructions on at least one non-transitory computer-readable medium.

23. A method comprising:
displaying, by a media content access subsystem by way of a graphical user interface, a graphical representation of a three-dimensional virtual world;
displaying, by the media content access subsystem by way of the graphical user interface, a graphical representation of a water cycle within the graphical representation of the virtual world; and
displaying, by the media content access subsystem by way of the graphical user interface, a plurality of display elements flowing through a plurality of streams within the graphical representation of the water cycle in accordance with one or more flow heuristics,
wherein the plurality of display elements are representative of a plurality of media content instances,
wherein each of the plurality of streams is controlled at least in part by a different flow heuristic within the one or more flow heuristics such that each of the plurality of streams includes a different group of display elements; and
wherein the one or more flow heuristics are configured to facilitate discovery by a user of at least one media content instance within the plurality of media content instances in a personalized manner.

24. The method of claim 23, further comprising presenting, by the media content access subsystem, the at least one media content instance for experiencing by the user.

25. A system comprising:
at least one computing device including:
a display facility configured to display facility configured to display, by way of a graphical user interface, a plurality of display elements that flow through a plurality of streams within a graphical representation of a water cycle in accordance with one or more flow heuristics,
wherein each of the plurality of display elements is representative of one of a plurality of media content instances, and
wherein each of the plurality of streams is controlled at least in part by a different flow heuristic within the one or more flow heuristics such that each of the plurality of streams includes a different group of display elements;

a detection facility communicatively coupled to the display facility and configured to detect a user interaction; and a content flow management facility communicatively coupled to the detection facility and configured to dynamically adjust the flow of the plurality of display elements through the plurality of streams in accordance with the user interaction.

* * * * *